US006421897B1

(12) United States Patent
Amaral et al.

(10) Patent No.: US 6,421,897 B1
(45) Date of Patent: Jul. 23, 2002

(54) INSERTION TOOL FOR INSERTING AN O-RING INTO AN INTERNAL O-RING

(75) Inventors: Antonio M. Amaral, East Providence; Stanley J. Olson, Newport, both of RI (US); Jonathan M. Ferreira, Swansea, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/795,503

(22) Filed: Feb. 28, 2001

(51) Int. Cl.$^7$ ................................................ B23P 19/02
(52) U.S. Cl. ........................................................ 29/235
(58) Field of Search ........................... 29/235, 278, 280

(56) References Cited

U.S. PATENT DOCUMENTS

| 5,050,282 A | * | 9/1991 | Zannini | 29/235 |
| 5,138,752 A | * | 8/1992 | Tasner | 29/235 |
| 6,012,209 A | * | 1/2000 | Whetstone | 29/235 |
| 6,108,884 A | * | 8/2000 | Castleman et al. | 29/235 |

\* cited by examiner

*Primary Examiner*—Robert C. Watson
(74) *Attorney, Agent, or Firm*—Michael J. McGowan; James M. Kasischke; Prithvi C. Lall

(57) ABSTRACT

The insertion tool is used to insert an oversized O-ring into a groove, such as a internal groove in an seal housing. The insertion tool includes a base for supporting the housing and an O-ring support extending into the housing and having a top support surface generally aligned with the groove. The O-ring is generally held into position proximate the groove using holding pins around which the O-ring is looped. Pie shaped segments are positioned onto the O-ring support between the holding pins to secure respective sections of the O-ring into the groove. Radial pushers are positioned in spaces between each of the segments, and a retainer ring is disposed over the segments and radial pushers. A central pusher rod extends through a hole in the O-ring support and base, and a cam plunger engages cam surfaces on the radial pushers. The holding pins are removed and movement of the cam plunger causes the radial pushers to move radially, thereby completely inserting the O-ring into the groove.

12 Claims, 5 Drawing Sheets

INSERTION TOOL FOR INSERTING AN O-RING INTO AN INTERNAL O-RING

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to O-ring insertion tools and methods and more particularly, to a tool and method for inserting an oversized O-ring into a standard or O-ring groove in an O-ring housing.

(2) Description of the Prior Art

O-rings are commonly used to accomplish sealing in various types of housings to prevent the passage of liquids or gasses therethrough. Positioning the O-ring has been a problem especially in housings where the O-ring is seated in an internal O-ring groove within the housing. New O-ring seal designs have made insertion of the O-ring even more difficult.

In one example, a dual O-ring seal system has been designed to provide a high pressure seal for a propulsor rotary shaft in a torpedo. This high pressure dual O-ring seal system requires oversized O-rings to be installed within an inner floating seal housing. Although this can be accomplished by hand, installation by hand is difficult if the O-ring is hard, slippery and considerably oversized.

Canted O-rings further complicate installation. In a canted O-ring design, the O-ring is provided at an angle in a plane not perpendicular to the axis of the shaft in order to provide for better lubrication and reduced wear.

SUMMARY OF THE INVENTION

One object of the present invention is facilitating insertion of an oversized O-ring into an O-ring groove within an O-ring housing.

Another object of the present invention is aiding insertion of one or more O-rings into a canted O-ring groove within an O-ring housing.

To accomplish these objectives, the present invention features an insertion tool comprising a base having a top base surface for supporting the O-ring housing. An O-ring support extends from the top base surface and is supported on the top base surface and around the O-ring support. The O-ring support has a top surface that generally aligns with the O-ring groove in the O-ring housing. In one embodiment, the O-ring support is wedge shaped and the top support surface is angled with respect to the top base surface such that the top support surface generally aligns with a canted O-ring groove in the O-ring housing. A hole extends through the base and the O-ring support and is generally perpendicular to the top support surface.

Four to eight segments are positioned on the top support surface for securing respective sections of the O-ring into the O-ring groove in the O-ring housing. A plurality of spaces are formed between adjacent ones of the plurality of segments. A plurality of radial pushers are positioned on the top support surface and are received in respective spaces between the segments. Each of the radial pushers includes a cam surface facing a center of the O-ring support. A retainer is positioned onto the segments and the radial pushers to retain the segments and pushers on the top support surface.

The insertion tool also comprises a central pusher having a rod and a cam plunger at one end of the rod. The rod extends through the hole in the O-ring support and the base such that the cam plunger engages the cam surface on each of the pushers and causes the pushers to push the O-ring loops into the O-ring groove.

In the preferred embodiment, the insertion tool further includes a plurality of O-ring holding pins slidingly extending through the base and through the O-ring support. O-ring loops are formed around each of the O-ring holding pins and within the spaces between the segments. A retractor, coupled to the O-ring holding pins, retracts the O-ring holding pins all at once below the top support surface before the radial pushers push the O-ring loops into the O-ring groove. Segment holding pins preferably extend from the top support surface into each of the segments for holding the segments into position on the top support surface.

According to one embodiment, the retainer is ring shaped, and the segments are pie shaped. Where the O-ring is being inserted into a canted O-ring groove, the segments and the retainer have elliptical mating edge surfaces corresponding to the canted O-ring groove when positioned on the angled top support surface of the O-ring support.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
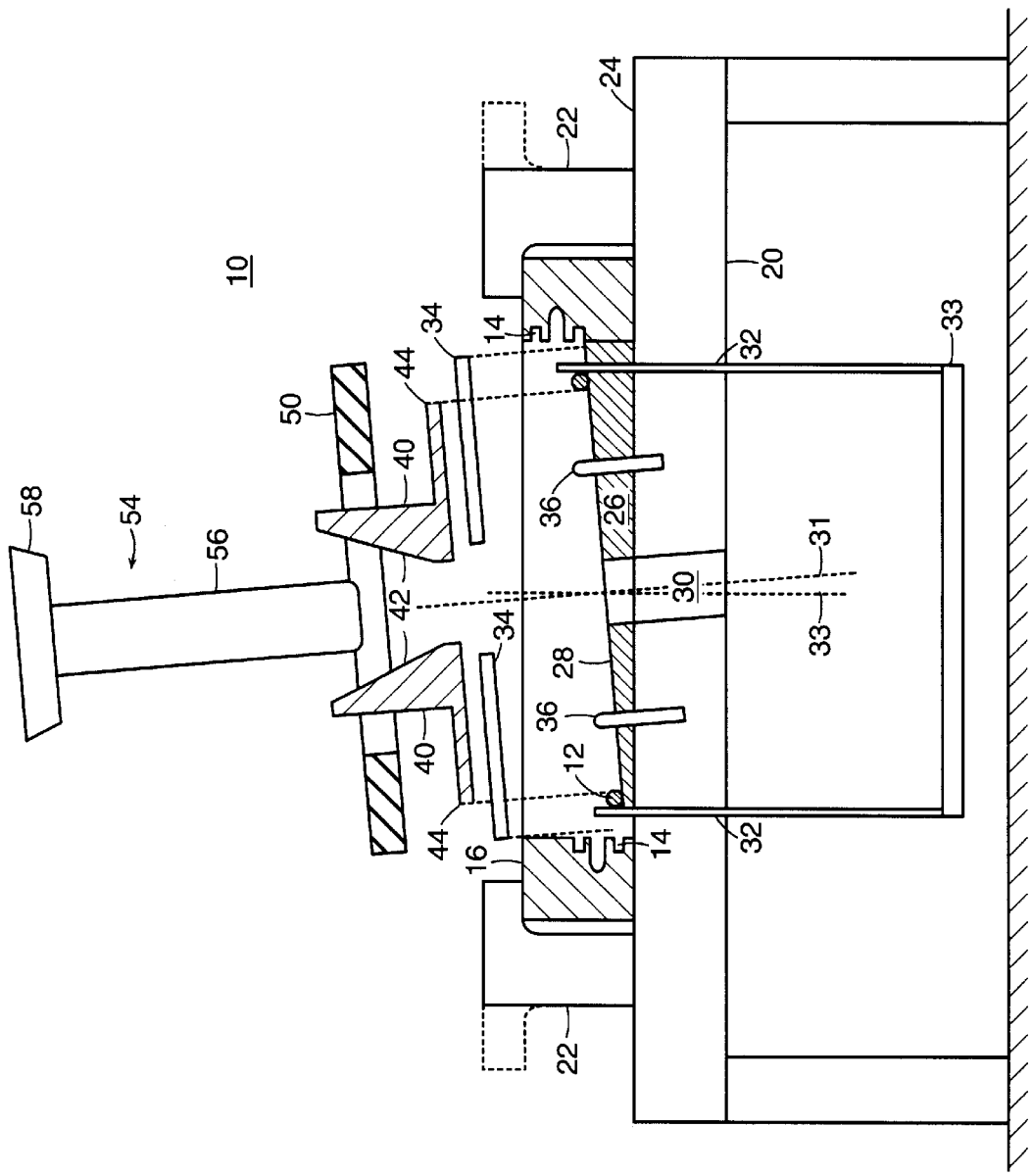
FIG. 1 is an exploded cross-sectional view of the O-ring insertion tool, according to one embodiment of the present invention.

The insertion tool 10, FIG. 1, according to the present invention, is used to insert an oversized O-ring 12 into an O-ring groove 14 within an O-ring housing 16. In the exemplary embodiment, the O-ring housing 16 includes two canted O-ring grooves 14. The insertion tool 10 can be used to insert any number of O-rings 12 into any number of O-ring grooves 14 having any type of configuration.

The insertion tool 10 includes a base 20 that supports the O-ring housing 16 during the insertion process. One or more O-ring housing holders 22 secure the O-ring housing 16 to a top base surface 24. In one example, the holders 22 are rotating tabs that rotate from a disengaged position, shown with dashed lines, into engagement with the O-ring housing 16. The holders 22 can be any type of mechanism or device capable of holding the O-ring housing 16 to the top base surface 24.

An O-ring support 26 extends upwardly from the base 20 and includes a top support surface 28 to support the O-ring 12. The O-ring housing 16 is positioned on the top base surface 24 with the O-ring support 26 extending into an internal region of the O-ring housing 16 such that the O-ring support 26 aligns the O-ring housing 16. The O-ring support 26 can be separate from the base 20 or one piece with the base 20. The top support surface 28 generally aligns with the O-ring groove 14 into which the O-ring 12 is to be inserted.

In the exemplary embodiment for canted O-ring, the O-ring support 26 is a cylinder cut at non-perpendicular angle to its axis giving a wedge shape and the top support surface 28 is angled to generally align with the canted O-ring grooves 14. The O-ring support 26 can also have a top support surface 28 that is generally perpendicular to the axis of the O-ring housing 16. A hole 30 extends through both the base 20 and the O-ring support 26 and is generally perpendicular to the top support surface 28. The center line 31 of the hole 30 intercepts the center line 33 of the O-ring housing 16 and the O-ring support 26 generally at the top support surface 28.

One or more O-ring holding pins 32 slidably extend through the base 20 and O-ring support 26 to hold the O-ring 12 into position proximate the O-ring groove 14. The O-ring holding pins 32 preferably extend generally perpendicular to the top base surface 24. A retractor 33 can be coupled to the O-ring holding pins 32 to retract the O-ring holding pins below the top support surface 28. Other mechanisms or methods for retracting the holding pins 32 can also be used. A plurality of segments 34 are positioned onto the top support surface 28 to secure or retain the O-ring 12 into the O-ring groove 14 before complete insertion. Segment holding pins 36 extend upwardly from the top support surface 28 to hold the segments 34 into position. The segment holding pins 36 are preferably perpendicular to the top support surface 28. Pins 36 are not necessarily required to engage base 20 since the holding pins 32 already align the O-ring support 26 to base 20.

Figure 2:
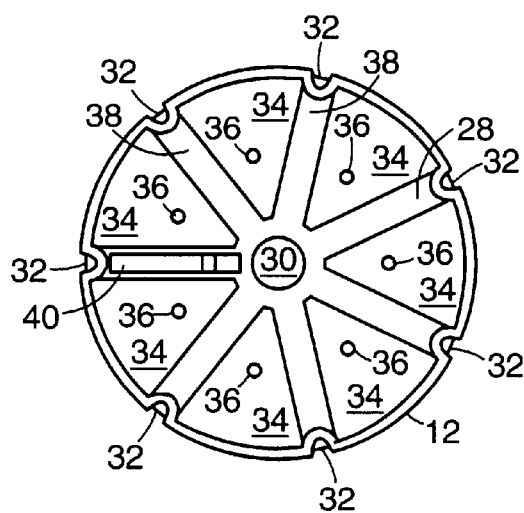
FIG. 2 is a top view of the segments of the insertion tool, according to one embodiment of the present invention.

As shown in FIG. 2, the O-ring 12 is looped inside each of the O-ring holding pins 32 and outside segments 34. The segments 34 are preferably pie shaped and are positioned between the holding pins 32 such that the O-ring 12 loop around each of the holding pins 32 extends into spaces 38 formed between each of the segments 34. Each of the pie shaped segments 34 secures a section of the O-ring 12 into the O-ring groove 14. Although the exemplary embodiment shows seven segments 34, the number of segments required depends on the excess O-ring material that must be simultaneously pushed into the O-ring groove 14 and the stability of the loops of the O-ring 12 around each of the holding pins 32. The preferred number of segments 34 is in the nominal range of four to eight. Only the minimum number required for each design should be used.

A plurality of radial pushers 40 are positioned in the spaces 38 formed between the segments 34. Each of the radial pushers 40 (see FIG. 1) include a cam surface 42 generally facing a center region of the O-ring support 26 and a pushing end 44 that faces the O-ring sections looped around each of the holding pins 32. The thickness of the pushing ends 44 is preferably slightly more than the cross-sectional diameter of the O-ring 12. Although the exemplary embodiment shows seven radial pushers 40 between each of the segments 34, additional or fewer pushers may be used depending upon the number of segments 34.

Figure 3:
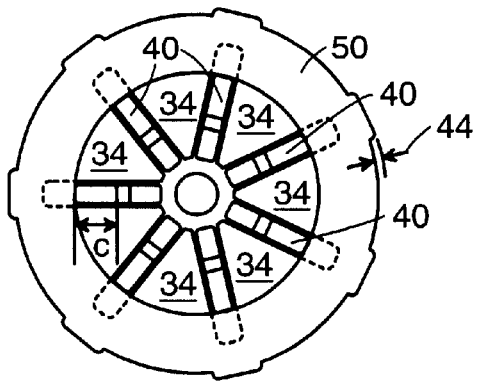
FIG. 3 is a top view of the retainer covering the segments, according to one embodiment of the present invention.

A retainer 50, FIG. 3, is positioned onto the segments 34 and radial pushers 44. The retainer 50 is preferably ring shaped to allow the cam surface 42 of the radial pushers 40 to extend upwardly through the center of the retainer 50. A clearance between each radial pusher 40 and retainer 50 is sufficient to allow each radial pusher 40 to push the O-ring 12 into the O-ring groove 14. The retainer 50, segments 34, and pushers 40 are preferably made of LEXAN plastic for unrestricted visibility of the O-ring 12. The materials used can also include other types of plastics, composites, or aluminum.

In the exemplary embodiment of a canted O-ring groove 14, the segments 34 and retainer 50 have elliptical mating surfaces, and the segments 34 and wedge location should be labeled for indexed fits. When the O-ring support 26 is wedge shaped, the outer diameter surfaces of segments 34 and retainer 50 are elliptical relative to the main horizontal surfaces of each part. This permits the two parts to perfectly mate with the O-ring housing 16 inner bore diameter when assembled onto the insertion tool 10 at the cant angle.

Figure 4:
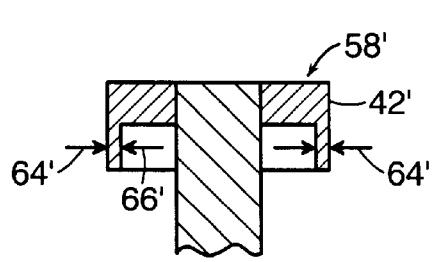
FIGS. 4–6 are side views of the cam plunger, according to three different embodiments of the present invention.
Figure 5:
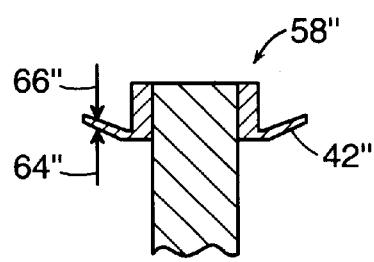
Figure 6:
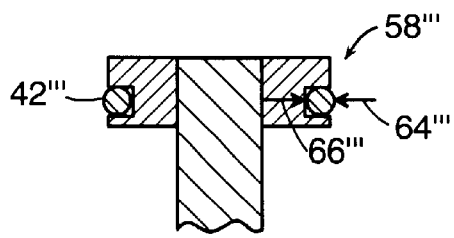

The insertion tool 10 further includes a central pusher 54 (see FIG. 1) having a rod 56 and a cam plunger 58. The rod 56 is sized to extend through the hole 30 such that the cam plunger 58 engages the cam surfaces 42 on the radial pushers 40. The cam pusher 58 shown in FIG. 1 has a truncated cone shape. Alternative embodiments for the cam plunger 58 are shown in FIGS. 4–6. In these embodiments, the cam plunger 58 is made of a flexible material to apply even pushing forces to each of the radial pushers 40. The cam plunger 58 may be fabricated to be elastically flexible by design and the use of flexible materials. This technique will result in applying relatively even loads to each cam surface 42 rather than equal movement or deflection when the central pusher 54 is fully depressed to seat the O-ring 12. This technique would ensure full contact with all of the pushing ends with the now fully seated O-ring 12 and could permit wider tolerances and more reliable O-ring insertion. FIG. 4 shows a cam plunger 58' having a flexible surface 64' having an annular configuration. Pressure on plunger 58' creates a force 66' on flexible surface 64' causing reduction in the radius of flexible surface 64' until force 66' is balanced by restoring force 68'. Flexible surface 64' can be segmented to allow easier bending.

FIG. 5 shows another embodiment for the cam plunger. In this embodiment, cam plunger 58" has a radially extending flexible surface 64". Pressure on plunger 58" creates a force 66" bending flexible surface 64". Flexible surface 64" exerts a restoring force 68" balancing force 66". As in the previous embodiment, flexible surface 64" can be segmented to allow easier bending.

FIG. 6 shows yet another embodiment for the cam plunger. In this embodiment, flexible surface 64''' is a compressible, ring positioned on the outside of plunger 58'''. Restoring force 68''' is provided by the compressibility of flexible surface 64'''.

In use, the O-ring housing 16 is first positioned onto the top base surface 24 such that the O-ring support 26 extends into the O-ring housing 16 and the top support surface 28 is generally aligned with the O-ring groove 14. The housing 16 is then secured to the top base surface 24, for example, using holders 22. The O-ring 12 is then inserted onto the top support surface 28 around the circumference and is looped around each of the O-ring holding pins 32.

The segments 34 are concurrently assembled onto the segment holding pins 36 to position a corresponding section of the O-ring 12 for insertion into the O-ring groove in the O-ring housing 16. The process of inserting the O-ring 12 and the segments 34 is continued until all of the segments 34 are in place. (See FIG. 2.)

Next, the radial pushers 40 are inserted into the spaces 38 between the segments 34. The radial pushers 40 are positioned such that the pushing ends 44 touch the innermost portion of the O-ring loops. When all of the radial pushers 40 have been inserted, the retainer 50 is placed over the segments 34 and pushers 40 (see FIG. 3). The retainer 50 also pushes down the O-ring holding pins 32 generally to the top of the segment 34.

Figure 7:
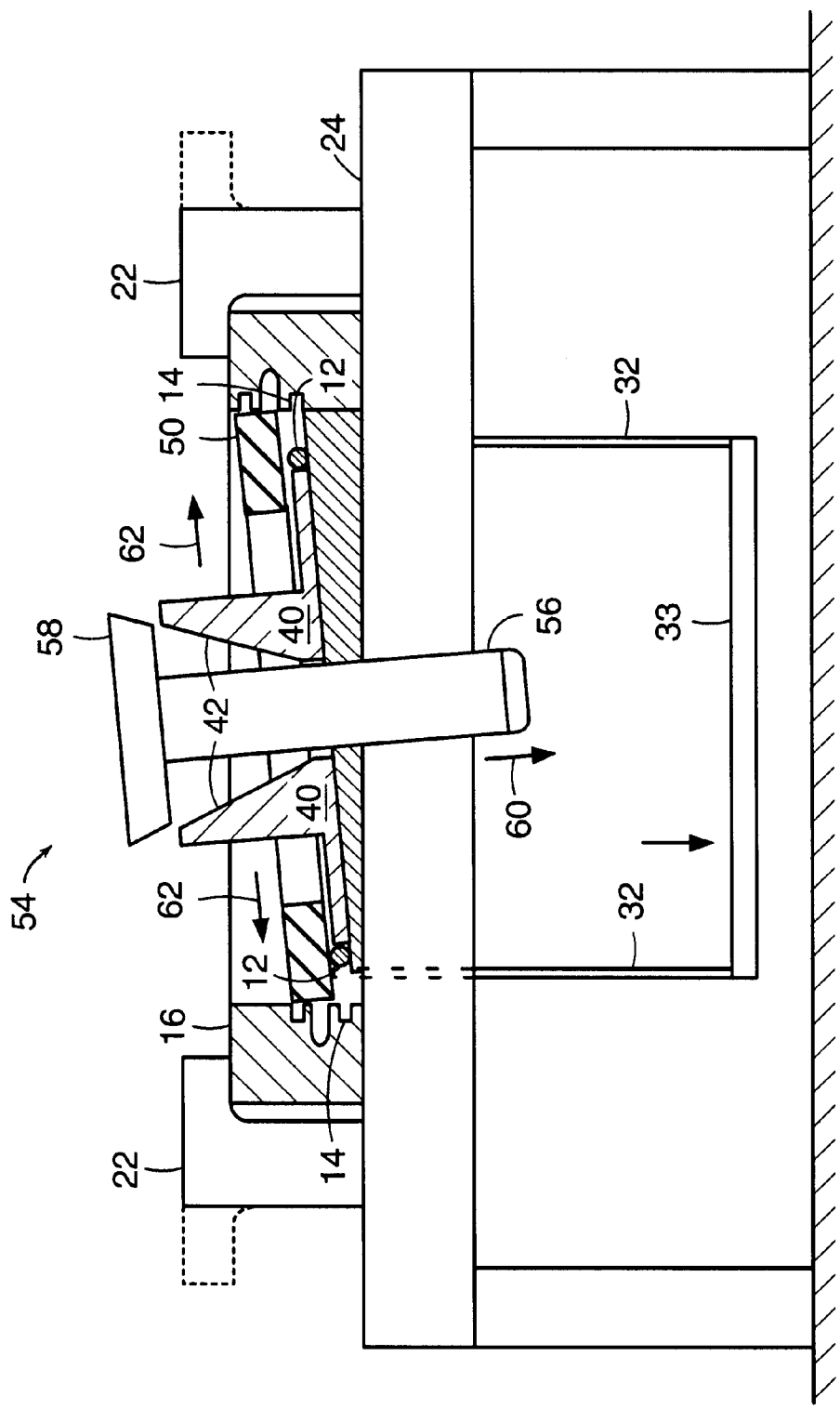
FIG. 7 is a partially cross-sectional side view of the insertion tool shown in FIG. 1 before the O-ring is inserted into the O-ring groove.
Figure 8:
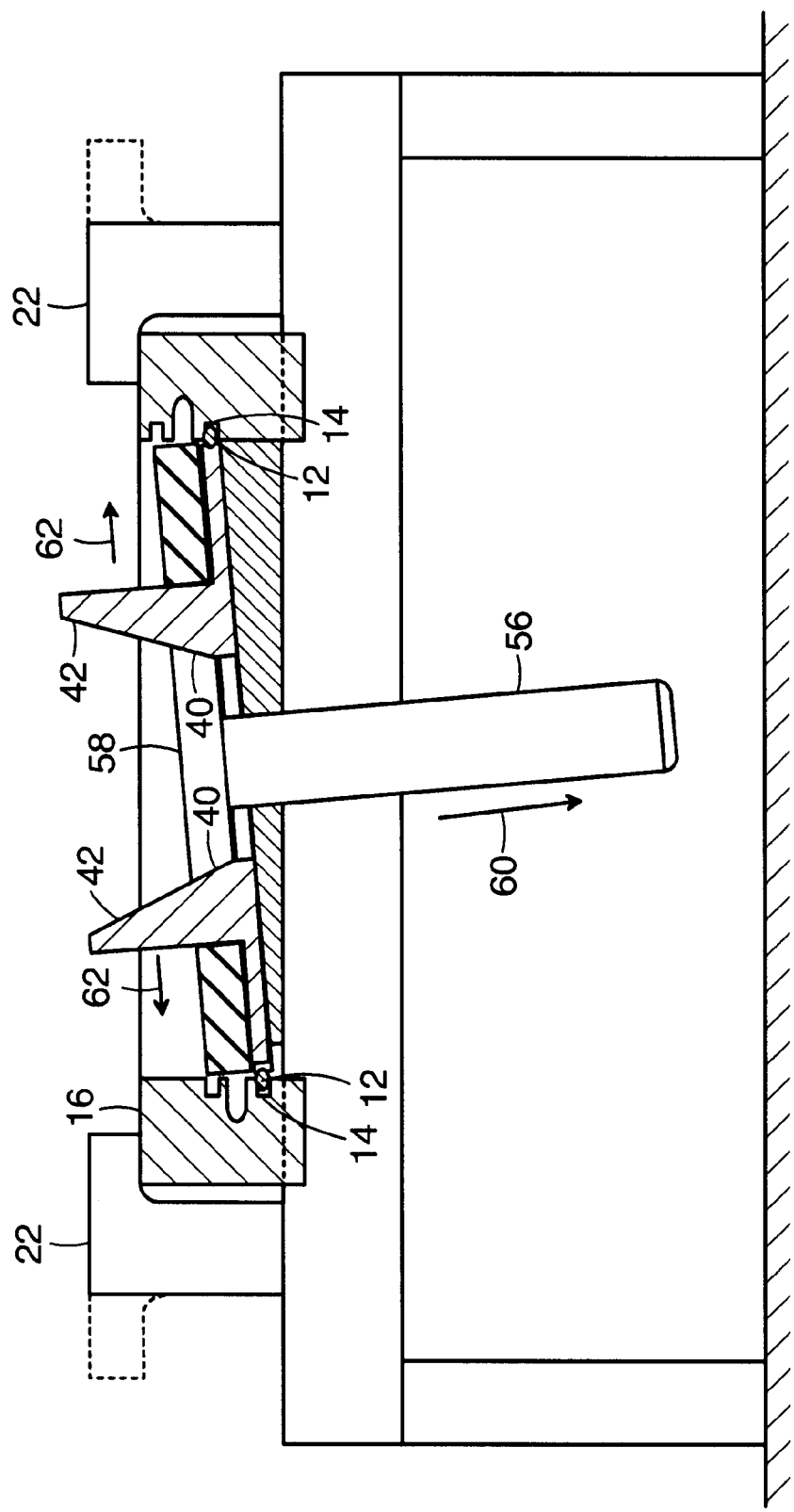
FIG. 8 is a partially cross-sectional side view of the insertion tool shown in FIG. 1 just after the O-ring has been inserted.

The central pusher rod 56 is then inserted into the hole 30, as shown in FIG. 7. The O-ring holding pins 32 are then retracted below the top support surface 28, for example, by the retractor 33 coupled to all of the holding pins 32. When the holding pins 32 have been retracted, the central pusher 54 is pushed generally in the direction of arrow 60 while holding the retainer 50 in place. The cam plunger 58 thereby engages the cam surfaces 42 causing the radial pushers 40 to move generally in the radial directions of arrows 62 and the pushing ends 44 push the remaining sections of the O-ring 12 into the groove 14, as shown in FIG. 8.

After the O-ring 12 has been completely inserted, the O-ring housing 16 can be removed, and the insertion tool 10 can be disassembled. If the housing 16 is symmetrical and has a second O-ring groove 14, the housing 16 can be turned over to insert a second O-ring into the second O-ring groove in the same manner as described above.

Figure 9A:
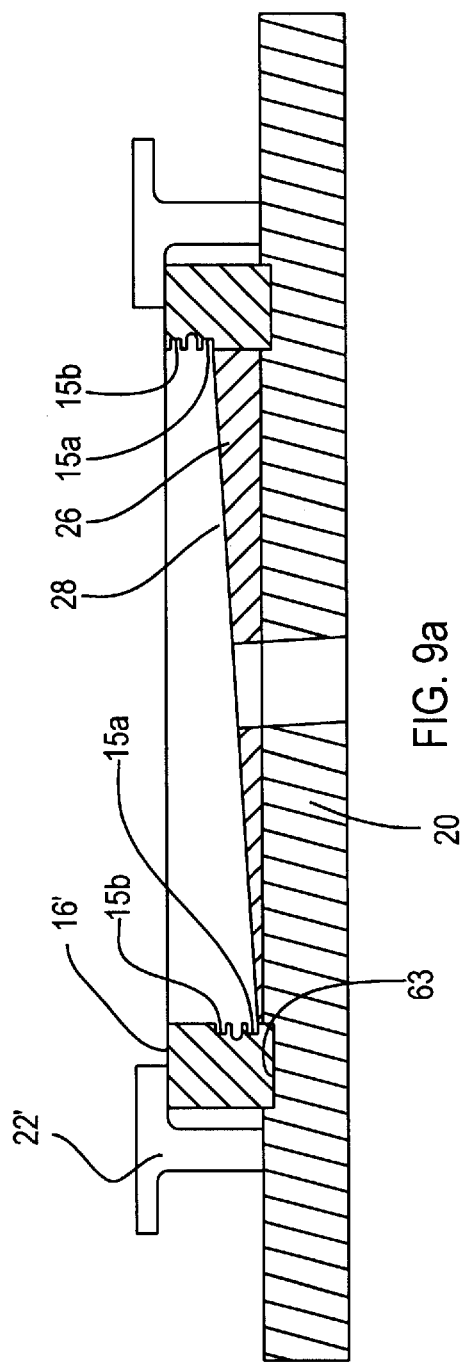
FIGS. 9a and 9b are a partially cross-sectional side views of the insertion tool adapted to insert O-rings into an asymmetrical O-ring housing.
Figure 9B:
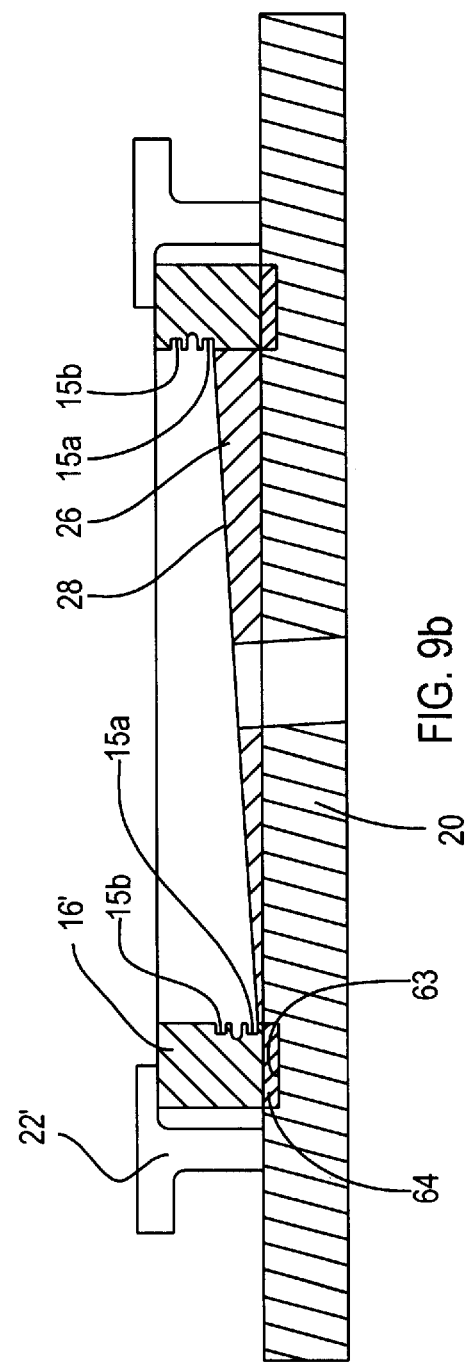

If the housing 16 is not symmetrical when turned over, a different insertion tool set-up may be required as shown in FIGS. 9a and 9b. FIG. 9a shows the configuration for insertion of the O-ring into the O-ring groove 15a away from the edge of housing 16'. FIG. 9b shows the configuration for insertion of the O-ring into the groove 15b positioned near the edge of housing 16'. Minor modifications are made to the tool for adjusting the O-ring housing 16' height relative to the existing support 26. A counter bored annular groove 63 in base 20 accommodates a removable annular shim 64 of suitable thickness to properly line up both O-ring grooves in the O-ring housing 16 relative to support 26 top surface 28. Two step O-ring housing is holders 22' accommodate two position clamping.

In FIG. 9a, shim 64 is removed, O-ring housing sits in annular groove 63 allowing O-ring groove 15a to align with top surface 28. Housing holders 221 are positioned to retain housing 16' at a lower level. In FIG. 9b, housing 16' is turned over for positioning an O-ring in O-ring groove 15b. Shim 64 is inserted in annular groove 63 allowing O-ring groove 15b to align with top surface 28. Housing holders 22' are in a second position for retaining housing 16' at a higher level.

Although the method of inserting the O-ring has been described in connection with the exemplary embodiment of the insertion tool 10, the method of inserting an oversized O-ring into a canted O-ring groove can be applied using an insertion tool having other designs.

Accordingly, the insertion tools and method of the present invention permits the reliable insertion of oversized O-rings into a seal housing without requiring special skills and without causing damage to the O-ring. The insertion tool and method is particularly suited for inserting O-rings into canted O-ring grooves. The insertion tool and method can be used repeatedly and can be utilized on large O-ring diameters that are more difficult to insert. The insertion tool and method also requires minimal training.

In light of the above, it is therefore understood that within the scope of the appended claims, the invention may be practiced otherwise than as specifically described.

What is claimed is:

1. An insertion tool for inserting an O-ring into a groove in an O-ring housing, said insertion tool comprising:

a base having a top base surface for supporting said O-ring housing;

an O-ring support extending from said top base surface, said O-ring support having a top support surface that generally aligns with said O-ring groove in said O-ring housing and a hole therein extending through said base and said O-ring support, said hole being generally perpendicular to said top support surface and said O-ring support aligning said O-ring housing when said O-ring housing is supported on said top base surface and around said O-ring support;

a plurality of segments positioned on said O-ring support top support surface for securing respective sections of said O-ring into said O-ring groove in said O-ring housing, said plurality of segments defining a plurality of spaces between adjacent ones of said plurality of segments;

a plurality of radial pushers positioned on said top support surface and received in respective ones of said plurality of spaces between said segments, each of said radial pushers having a cam surface facing a center of said O-ring support;

a retainer positioned on said segments and said radial pushers to retain said segments and said radial pushers on said top support surface; and a central pusher having a rod and a cam plunger at one end of said rod, wherein said rod extends through said hole through said O-ring support and said base such that said cam plunger engages said cam surface on each of said radial pushers and causes said radial pushers to move radially outward whereby said O-ring is pushed into said groove in said O-ring housing.

2. The insertion tool of claim 1 further including a plurality of O-ring holding pins slidably extending through said base and through said O-ring support for holding said O-ring between said segments by looping said O-ring around each of said O-ring holding pins between said segments.

3. The insertion tool of claim 2 further including a retractor coupled to said O-ring holding pins for retracting said O-ring holding pins below said top support surface before said radial pushers move radially outward pushing said O-ring into said O-ring groove.

4. The insertion tool of claim 1 further including segment holding pins extending from said O-ring support top support surface into each of said segments for holding said segments in position on said top support surface.

5. The insertion tool of claim 1 wherein said retainer is ring shaped.

6. The insertion tool of claim 1 wherein said segments are pie-shaped.

7. The insertion tool of claim 1 wherein said O-ring support is wedge shaped in cross section and said top support surface is angled with respect to said top base surface such that said top support surface generally aligns with a canted O-ring groove in said O-ring housing.

8. The insertion tool of claim 7 wherein-said segments and said retainer have elliptical mating surfaces corresponding to said canted O-ring groove in said O-ring housing when positioned on said angled top support surface of said O-ring support.

9. The insertion tool of claim 1 wherein said cam plunger is a flexible plunger.

10. The insertion tool of claim 1 further comprising O-ring housing holders releasably holding said O-ring housing against said top base surface.

11. The insertion tool of claim 1 further comprising a shim ring positionable on said base top surface for supporting said O-ring housing at a different elevation.

12. The insertion tool of claim 1 further comprising O-ring housing holders holding said O-ring housing against said top base surface, said O-ring housing holders being positionable at at least two heights for accommodating said O-ring housing alone and said O-ring housing with said shim ring.

* * * * *